(12) United States Patent
Bardehle

(10) Patent No.: US 6,757,374 B2
(45) Date of Patent: Jun. 29, 2004

(54) METHOD FOR CONTROLLING ADDITIONAL SERVICE FUNCTIONS IN A COMMUNICATIONS NETWORK, AS WELL AS AN ASSOCIATED COMMUNICATIONS NETWORK AND AN ASSOCIATED PROGRAM

(75) Inventor: Lutz Bardehle, Salzkotten (DE)

(73) Assignee: Siemens Aktiengesellschaft, Munich (DE)

( * ) Notice: Subject to any disclaimer, the term of this patent is extended or adjusted under 35 U.S.C. 154(b) by 401 days.

(21) Appl. No.: 09/781,704

(22) Filed: Feb. 12, 2001

(65) Prior Publication Data

US 2002/0009077 A1 Jan. 24, 2002

(30) Foreign Application Priority Data

Feb. 10, 2000 (DE) .......................................... 100 05 798

(51) Int. Cl.[7] .............................................. H04M 3/00
(52) U.S. Cl. .................. 379/265.09; 370/352; 370/353; 370/401; 379/265.02; 379/88.13; 379/88.14; 379/93.09; 379/93.15
(58) Field of Search ...................... 379/265.02, 201.01, 379/265.09, 88.13, 88.14, 93.09, 93.15; 709/230; 370/270, 351, 352, 402, 401

(56) References Cited

U.S. PATENT DOCUMENTS

| | | | | |
|---|---|---|---|---|
| 5,822,404 A | * | 10/1998 | Cave | ........................ 379/88.13 |
| 6,389,132 B1 | * | 5/2002 | Price | ...................... 379/265.01 |
| 6,421,425 B1 | * | 7/2002 | Bossi et al. | .................... 379/52 |
| 6,449,260 B1 | * | 9/2002 | Sassin et al. | ................ 370/270 |
| 6,584,093 B1 | * | 6/2003 | Salama et al. | ............... 370/351 |
| 6,584,185 B1 | * | 6/2003 | Nixon | .................... 379/201.01 |
| 6,665,395 B1 | * | 12/2003 | Busey et al. | ............ 379/265.09 |
| 2001/0043608 A1 | * | 11/2001 | Potter et al. | ................. 370/401 |
| 2001/0046234 A1 | * | 11/2001 | Agrawal et al. | ............. 370/402 |
| 2001/0056496 A1 | * | 12/2001 | Tam | ............................ 709/230 |
| 2002/0114321 A1 | * | 8/2002 | Ogren | ......................... 370/352 |

* cited by examiner

*Primary Examiner*—Bing Bui
(74) *Attorney, Agent, or Firm*—Bell, Boyd & Lloyd LLC

(57) ABSTRACT

A method for controlling additional service functions in a communications network, as well as an associated coujmincations network and an associated program, wherein data is transmitted between a number of terminals in the communications network using at least one identifier which is used to identify a connection in accordance with the first connection model, the connection identifier being converted to a least one indentifier which is used to identify a connection according to a second connection model which is provided for controlling call distribution from a computer so as to allow various international Standards to be satisfied at the same time.

22 Claims, 9 Drawing Sheets

METHOD FOR CONTROLLING ADDITIONAL SERVICE FUNCTIONS IN A COMMUNICATIONS NETWORK, AS WELL AS AN ASSOCIATED COMMUNICATIONS NETWORK AND AN ASSOCIATED PROGRAM

BACKGROUND OF THE INVENTION

1. Field of the Invention

The present invention relates to a method for controlling additional service functions, in which data is transmitted to at least one terminal in either a telecommunications network or a communications network using at least one identifier. The identifier identifies a connection in a first connection model.

2. Description of the Prior Art

A method such as that described above is standardized, for example, in the following ITU-T International Standards (International Telecommunication Union-Telecommunication):

H.323 (02/98) Packed Based Multimedia Communications Systems,

H.225.0(02/98) Call Signaling Protocols and Mediastream Packetization for Packed-Based Multimedia Communications Systems, and H.245(05/99) Control Protocol for Multimedia Communication.

The connection model on which these Standards are based defines an identifier, called CallID, which uniquely identifies a connection between two terminals. Other identifiers are used for conference circuits including a number of terminals, for example the identifier ConferenceID.

Based on the H.323 Standard, a number of additional service functions have been standardized:

H.450.1(02/98) Generic Functional Protocol for the Support of Supplementary Services, H.450.2(02/98) Call Transfer Supplementary Service for H.323, H.450.3(02/98) Call Diversion Supplementary Service for H.323, H.450.4(05/99) Call Hold Supplementary Service for H.323, H.450.5(05/99) Call Park and Call Pickup Supplementary Services for H.323, H.450.6(05/99) Call Waiting Supplementary Service for H.323, H.450.7(05/99) Message Waiting Indications Supplementary Service for H.323.

The cited additional functions have been developed on the basis of the connection model defined in the H.323 Standard. This connection model is very simple, but is not suitable for all applications.

An object of the present invention therefore, is to specify a simple method for controlling additional service functions wherein it is possible to control even those service functions for which the first connection model is suitable only to a limited extent. Furthermore, the present invention has the aim of specifying an associated communications network and an associated program.

SUMMARY OF THE INVENTION

Accordingly, the present invention is based on the knowledge that there is a preferred connection model for each service function which, when used, allows the service function to be carried out in a very simple manner. Thus, for example, ECMA Standard (European Computer Manufacturer Association) "Services for Computer Supported Telecommunications Applications (CSTA) Phase III", Section 6.1.5 explains a connection model in which there is a joint call between two terminals. A first connection exists between the first terminal and the call. A second connection exists between the call and the second terminal. The connections are uniquely identified by the units identifier of the unit involved with the connection and by a call identifier for the relevant call. Although this connection model is more complex than the connection model defined in the H.323 Standard, it is more suitable for carrying out certain service functions. For example, a portion of the identifiers can be retained for call forwarding. If, for example, only two connection models are considered, then these connection models can each be assigned a number of service functions for whose implementation one connection model or the other is more suitable.

The present invention is furthermore based on the knowledge that it is simpler to comply with a number of Standards via additional measures than to add the service functions of the other Standard to one Standard. Specifically, it often takes a number of years to work out or revise a Standard.

For this reason, in the method according to the present invention, the identifier provided in the first connection model is converted to at least one identifier which is used to identify a connection according to a second connection model. The connection models and the respective identifiers as well differ from one another in their layout and/or in their value. The second connection model is provided for controlling additional service functions of the terminals from a computer which is not itself associated with any terminal. Control such as this is also referred to as third party control. In the method according to the present invention, the functionality of the terminals is expanded by at least one additional service function, using the identifiers provided in the second model.

Basic functions of the terminals, for example setting up and clearing connections, are those controlled according to a first connection model. Certain additional service functions are controlled according to a second connection model. The conversion of the identifiers makes it simple to change from one connection model to the other connection model. The method of the present invention allows one method to be used in each case for different service functions, which is based on a different connection model; namely on a connection model which is the most suitable.

In an embodiment of the present invention, the data transmitted in the telecommunications network contains data of different media types; in particular, voice data and/or picture data and/or program data. The first connection model is thus used for the transmission of multimedia data. One widely used Standard for such transmission is the H.323 Standard defined by the ITU-T (International Telecommunication Union-Telecommunication).

In a further embodiment, the identifier defined in the first connection model is a connection identifier, called CallID which identifies an existing connection or a connection which is to be set up between at least two terminals. The connection identifier has one part. There is no relationship with one terminal, or even with both terminals involved in the connection.

Additionally or alternatively, the second connection model for controlling additional service functions of the terminals in a telecommunications network from a computer is likewise defined in accordance with an international Standard, in particular in accordance with the CSTA Standard from the ECMA; for example, in accordance with the CSTA III Standard. However, other Standards are also used in the development; for example the TAPI Standard (Telephone Application Programming Interface) from MICROSOFT or the JTAPI Standard from SUN.

In another embodiment, the identifier defined in the second connection model contains a first part for identifying a terminal involved in the connection and a second part for identifying the call affected by the connection. A connection model such as this is defined, for example, in the CSTA Standard.

In another development, the additional service function relates to automatic call distribution from a central terminal for central selection of receiving terminals for receiving calls. Until now, automatic call distribution has been used mainly for terminals for voice transmission in so-called call centers. This refinement extends the application area of automatic call distribution to multimedia terminals as well which are actuated using a method which is based on a different connection model than that defined, for example, in the CSTA Standard.

In a refinement of the additional service function call distribution, feeder programs are executed in both the central terminal and each of the receiving terminals. When a feeder program is executed, messages are interchanged with a central conversion program which operates as an interface between a control computer for controlling the call distribution and between terminals to be included in the call distribution. The feeder programs are also referred to as deputy programs. The name Marshall program is used for the conversion program. A protocol which is based on the protocol used for call distribution is used for communication between the feeder program and the conversion programs. The concept of a conversion program and feeder programs allows terminals which actually need to be actuated using a different protocol to be actuated, nevertheless, using a protocol which is suitable for call distribution. In this context, reference is made to the German Patent Application with the Application Number 19947032.4.

In an embodiment of the present invention, the identifiers are converted during execution of the central conversion program. There need, therefore, be only one of these programs for conversion of the identifiers in this refinement. The terminals need not themselves convert any identifiers. In the same way, no identifiers need be converted in the control program for call distribution.

The calling terminals may, but need not, contain a feeder program. In one development, calls arriving from terminals without a feeder program are distributed using the same method as calls arriving from terminals with a feeder program. This is possible since a calling terminal need not be actuated using a method which is based on the second connection model. The calling terminal can be actuated using a method which is based on the first connection model; for example for call forwarding.

In another development, when a feeder program is started, a registration message which contains a data item for identifying the transmitting terminal is in each case transmitted to the conversion program. This measure results in the conversion program being informed about terminals which can be included in the call distribution.

In one refinement of the present invention, the conversion program transmits the identifiers of selected terminals, or of all the registered terminals, to the control program. This is done automatically or in response to a request coming from the control program. The control program can use the identifiers to decide which terminals it wishes to monitor. The selected terminals are monitored, with the conversion program passing on to the control program the messages which arrive from the units being monitored. The central terminal always needs to be monitored. In one refinement, a protocol is used between the terminals and the conversion unit, which is based on a protocol based on the second connection model. The CSTA III Standard is particular suitable for use as a basis for this.

In a further embodiment, a distribution program is used between the conversion program and the control program, and controls the passing on of messages as a function of destination presets. A program such as this is executed, for example, on a telecommunications server. The messages are passed on using program identifiers and/or domain names. Thus, in a development, messages arriving from the control program are passed on to the conversion program using an identifier which is produced by the control program and which denotes the conversion program. Messages arriving from the conversion program contain an identifier which was previously transmitted from the control program to the conversion program in a message for monitoring a specific terminal.

In another development, a call receiving program is executed in the receiving terminal. Messages produced during the execution of the call receiving program are passed on via the distribution program to the conversion program. Messages which are also required for controlling call distribution are also passed on to the control program. Passing the messages on to the conversion program means that the conversion program is aware of all the active terminals as well as all those units which are suitable for receiving calls. If a receiving terminal later becomes busy, then the conversion program can itself produce an appropriate message and transmit this to the control program; for example the event message "Event AgentBusy".

In one refinement, call distribution is carried out as follows. First of all, a call to the central terminal is processed using a method based on the first connection model; for example, in accordance with the H.323 Standard or in accordance with the H.225 and H.245 Standards which are linked to this Standard. In addition to the method steps encompassed by this Standard, the central terminal transmits a message, which signals the selection of the central terminal, via the conversion program to the control program. This message is, for example, the "Event Delivered" message defined in the CSTA III Standard. After the control program has received the message which signals this selection, this program transmits to the central terminal a message for call diversion to a receiving terminal. This message is, for example, the CSTA III message "DeflectCall" or a message "DMDeflectCall" based on this. The call diversion itself is then carried out using the method based on the first connection model, that is to say, for example, according to the H.323 Standard and, in particular, according to the H.450.3 Standard. This linking of methods from different Standards results in a simple method for call distribution. Standardized commands can be used so as to avoid any new development or adaptation of Standards.

In yet another development, once a connection has been set up between the calling terminal and the receiving unit which receives the diverted call, the conversion program transmits to the control program a message which signals the operator state of the receiving unit. This message is used to tell the control program that the relevant receiving terminal is currently unavailable for call distribution.

The present invention also relates to either a communications network or a telecommunications network which is suitable for carrying out the method according to the present invention and/or for carrying out the developments and refinements of the present invention. The technical effects quoted above thus also apply to the communications network. In particular, the communications network may also include terminals on which the feeder programs are executed. The communications network according to the present invention is particularly suitable for call distribution.

Furthermore, the present invention relates to a conversion program during whose execution the identifiers of various connection models are converted. The conversion program for the first time allows the majority of the effects of the method, and its refinements, to be exploited. In one development, the conversion program is stored on a data storage medium, for example on a floppy disk, CD (Compact Disc) or a magnetic disk drive.

Additional features and advantages of the present invention are described in, and will be apparent from, the following detailed description of the preferred embodiments and the drawings.

DETAILED DESCRIPTION OF THE PREFERRED EMBODIMENTS

Figure 1:
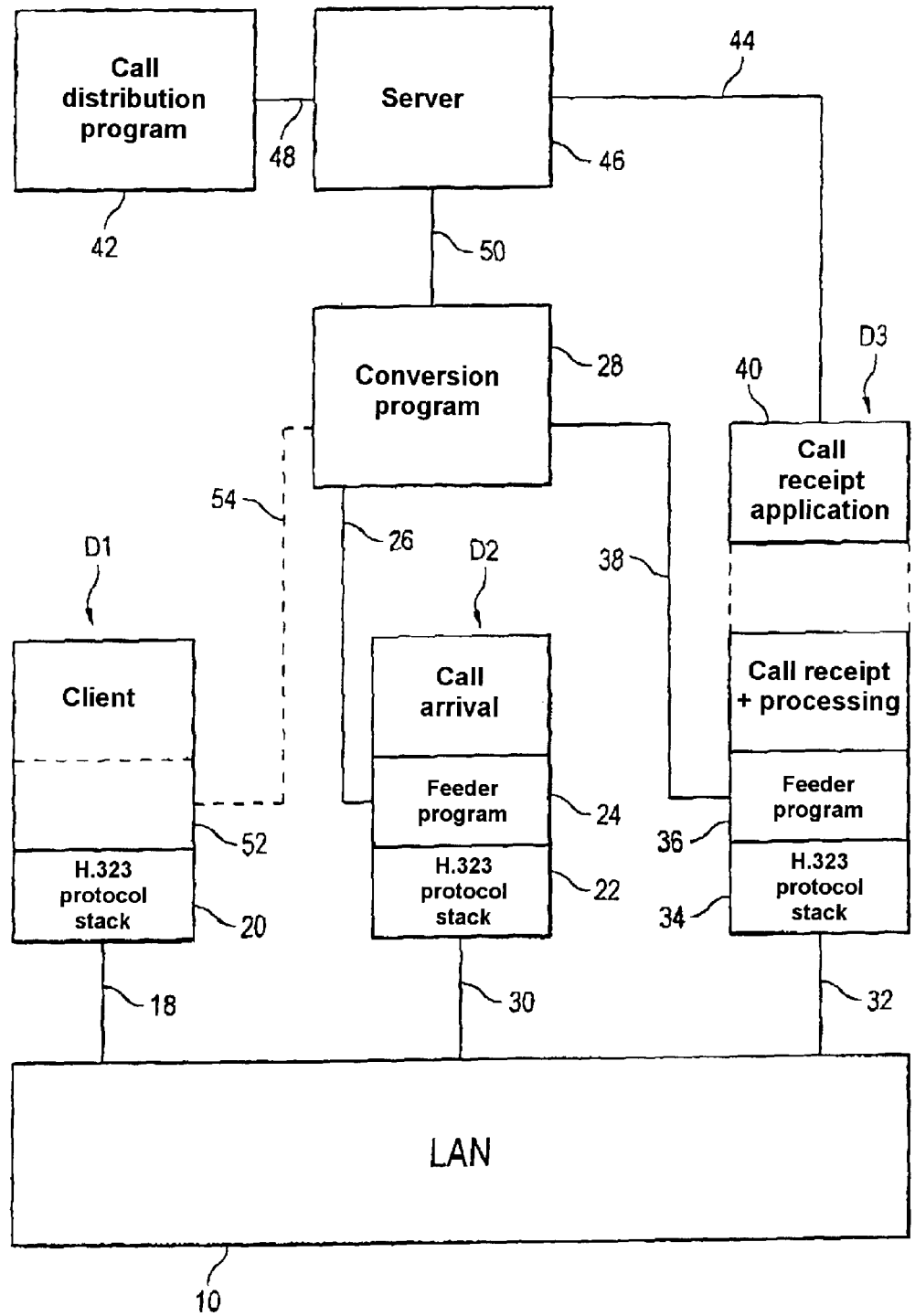
FIG. 1 shows an overview of program modules for call distribution in a communications network.

FIG. 1 shows an overview of program modules for call distribution in a local communications network 10, which is also referred to as a Local Area Network (LAN). The communications network 10 is, for example, an Ethernet or a Token-Ring network. The data is transmitted in data packets in accordance with Standards H.323, H.225 and H.245. Multimedia data is transmitted; that is, voice data, picture data and computer data, for example program data.

Only three of the terminals D1 to D3 which are operated in the communications network 10 are illustrated in FIG. 1, each of which has its own power supply, its own processor and its own memory. In another exemplary embodiment, the programs for controlling the terminals D1 to D3 are carried out in a single computer. The terminal D1 is connected via a line 18 to the communications network 10. When executing a program stored in the terminal D1, commands are received and transmitted via the line 18 in accordance with the H.323 protocol. Programs 20 in an H.323 protocol stack support various protocol layers which, for example, substantially comply with the layers illustrated in FIG. C.1 of Annex C to the H.323 Standard. However, the exemplary embodiment which is being explained uses the Internet Protocol IP rather than the lowermost ATM layer (Asynchronous Transfer Mode). The terminal is a client terminal, using which connections are set up to other terminals D2, D3 and calls from other terminals D2, D3 are received.

The terminal D2 is likewise a terminal used for transmitting multimedia data in accordance with H.323 Standard. In the context of call distribution, the terminal D2 operates as a central terminal, from which the incoming calls are distributed to further terminals, for example to the terminal D3. The terminal D2 is, therefore, also referred to as the call arrival terminal. Programs 22 in an H.323 protocol stack contain program modules for producing and evaluating messages in different protocol layers. Furthermore, the memory in the terminal D2 is used for storing a feeder program 24, also referred to as a deputy program. The feeder program 24 is connected via a data transmission connection 26 to a conversion program 28. The conversion program 28 is stored in the memory of a remote computer. In another exemplary embodiment, the conversion program 28 is executed on the same computer as the programs for the terminals D1 to D3. Use of the feeder program 24 and of the conversion program 28 allows the terminal D2 to be controlled and monitored in accordance with the CSTA III Standard. The details of this control and monitoring are explained below, with reference to FIGS. 2 to 8. The terminal D2 is connected to the communications network 10 via a line 30.

The terminal D3 is connected to the communications network 10 via a line 32 and is likewise used for transmitting multimedia data in accordance with the H.323 Standard. Programs 34 which process messages in different protocol layers in an H.323 protocol stack are stored in the memory of the terminal D3. A feeder program 36 is connected to the conversion program 28 via a data transmission connection 38. The interaction between the conversion program 28 and the feeder program 36 also allows the terminal D3 to be controlled and monitored in accordance with the CSTA III Standard. For call distribution purposes, the terminal D3 has the function of receiving calls distributed by the terminal D2. The terminal D3 is, therefore, also referred to as a call receiving terminal. A call receiving program 40, which is also referred to as an "Agent Application", is stored in the memory of the terminal D3. Someone operating the terminal D3 can register with a call distribution program 42 using the call receiving program 40. On registration, a data transmission connection 44 is set up to a server 46. The server 46 passes the data received via the data transmission connection 44 on registration on to the call distribution program 42 via a data transmission connection 48.

The server 46 also passes on messages and event messages which are produced during execution of the conversion program 28 and are transmitted to the server via a data transmission connection 50. Identifiers which are contained in the messages are used for passing on the messages and event messages in the server. For example, the terminal D1 to D3 thus belong to a common zone or domain, which is identified by a unique address. Those messages which are intended to be transmitted to the conversion program 28 contain an identifier for the domain. Messages which are intended to be transmitted from the conversion program 28 to the call distribution program 42 contain an identifier which has already been transmitted by the call distribution program via the server to the conversion program. The messages are passed on with the aid of this identifier; see also the explanation relating to FIGS. 2 to 8. In other exemplary embodiments, the message distribution is controlled, for example, by the call distribution program 42 or the conversion program 28.

In another exemplary embodiment, the terminal D1 also contains a feeder program 52 which interchanges data with the conversion program 28 via a data transmission connection 54. However, the method which is explained in the following text also operates without a feeder program 52 in the terminal D1.

Figure 2:
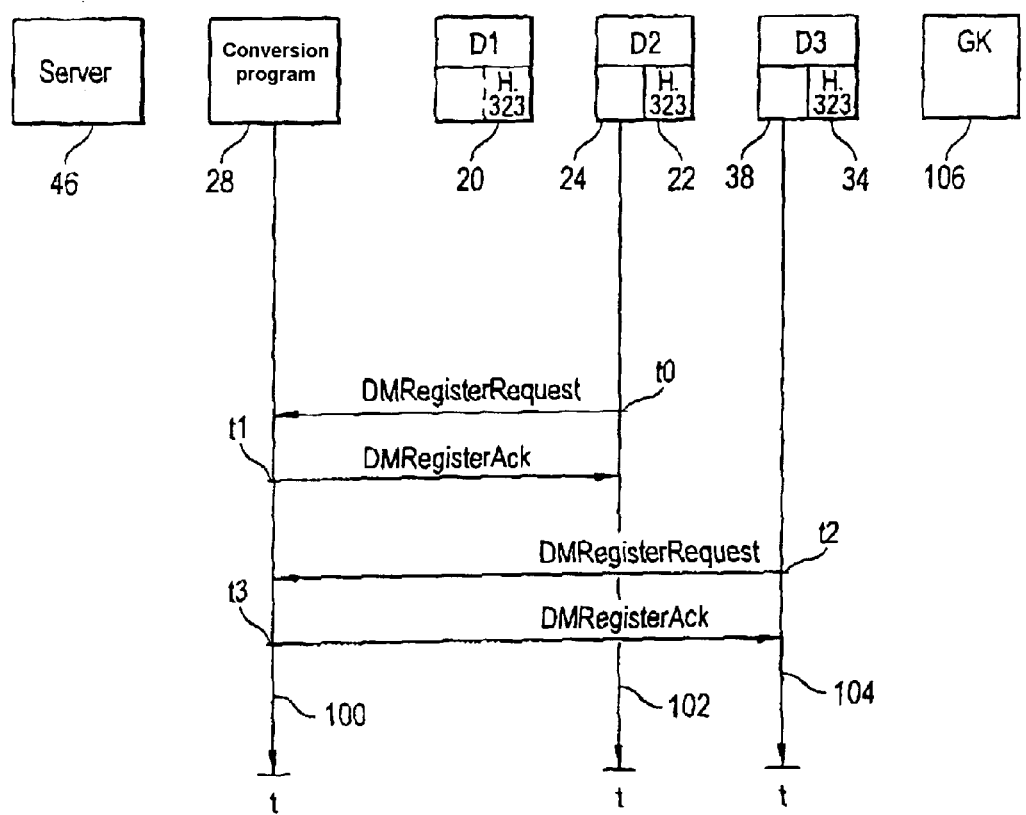
FIG. 2 uses a conversion program to show registration of messages transmitted by terminals.

FIG. 2 shows messages transmitted to the conversion program 28 for registration of the terminals D2 and D3. The messages are transmitted between the conversion program 28 and the terminals D2 and D3 using the feeder programs 24 and 28, respectively, in accordance with an internal-company protocol which substantially corresponds to the CSTA III Standard. The messages in this protocol are identified in the following text by the initial letters "DM". At the terminal D2 end, the messages for transmission to the conversion program 28 are produced by the feeder program 24. Messages arriving from the conversion program 28 are likewise received and processed by the feeder program 24 at the terminal D2 end. The messages to be transmitted to the conversion program 28 are produced by the feeder program 36 and the terminal D3. Messages arriving from the conversion program 28 are processed in the terminal D3 by the feeder program 36.

FIG. 2 shows the three time axes 100 to 104, which are parallel to one another and are moved further downward at later times than at earlier times. Simultaneous times lie on a straight line at right angles to the time axes 100 to 104.

For completeness, FIG. 2 also shows the server 46, the terminal D1 and an access unit 106. The access unit 106 is also referred to as a Gatekeeper GK and operates in accordance with the H.323 Standard. By way of example, addresses are allocated and access rights checked in the access unit 106.

Messages between the terminals D1 to D3 and the access unit 106 correspond to the messages defined in the H.323, H.225 and H.245 Standards. Messages between the conversion program and the server 46 as well as messages between the server 46 and the call distribution program 42 and the call receiving program 40, see FIG. 1, correspond to the messages defined in the CSTA III Standard.

At the time t0, the feeder program 24 in the terminal D2 transmits a registration message "DMRegisterRequest" to the conversion program 28. The message "DMRegisterRequest" contains the current operating state of the terminal D2 as a parameter "devState". Reception of the message "DMRegisterRequest" by the conversion program 28 is confirmed by a registration confirmation message "DMRegisterAck" at a time t1. The message "DMRegisterAck" is transmitted to the feeder program 24 via the data transmission connection 26 (see FIG. 1).

A message "DMRegisterRequest" is likewise transmitted to the conversion program 28 from the feeder program 36 of the terminal D3 at a time t2. This message also contains a parameter "devState" for storing the operating state of the terminal D3. The conversion program 28 confirms reception of this message at a time t3 by means of a message "DMRegisterAck" transmitted to the feeder program 36.

The messages "DMRegisterRequest" are transmitted by the terminals D2 and D3, for example, on being switched on. The conversion program 28 can use the message "DMRegisterRequest" at any time to determine which terminals D2, D3 are in operation at a specific time. The messages "DMRegisterRequest" each contain an identifier, for example a telephone number or a user identifier, using which the conversion program 28 can identify the feeder programs 24 and 36, respectively, and can allocate them to the units D2 and D3, respectively. After receiving the message "DMRegisterAck", the feeder programs 24 and 36, respectively, transmit event messages to the conversion program 28 when the events associated with the respective event messages occur in the respective terminals D2 and D3.

Figure 3:
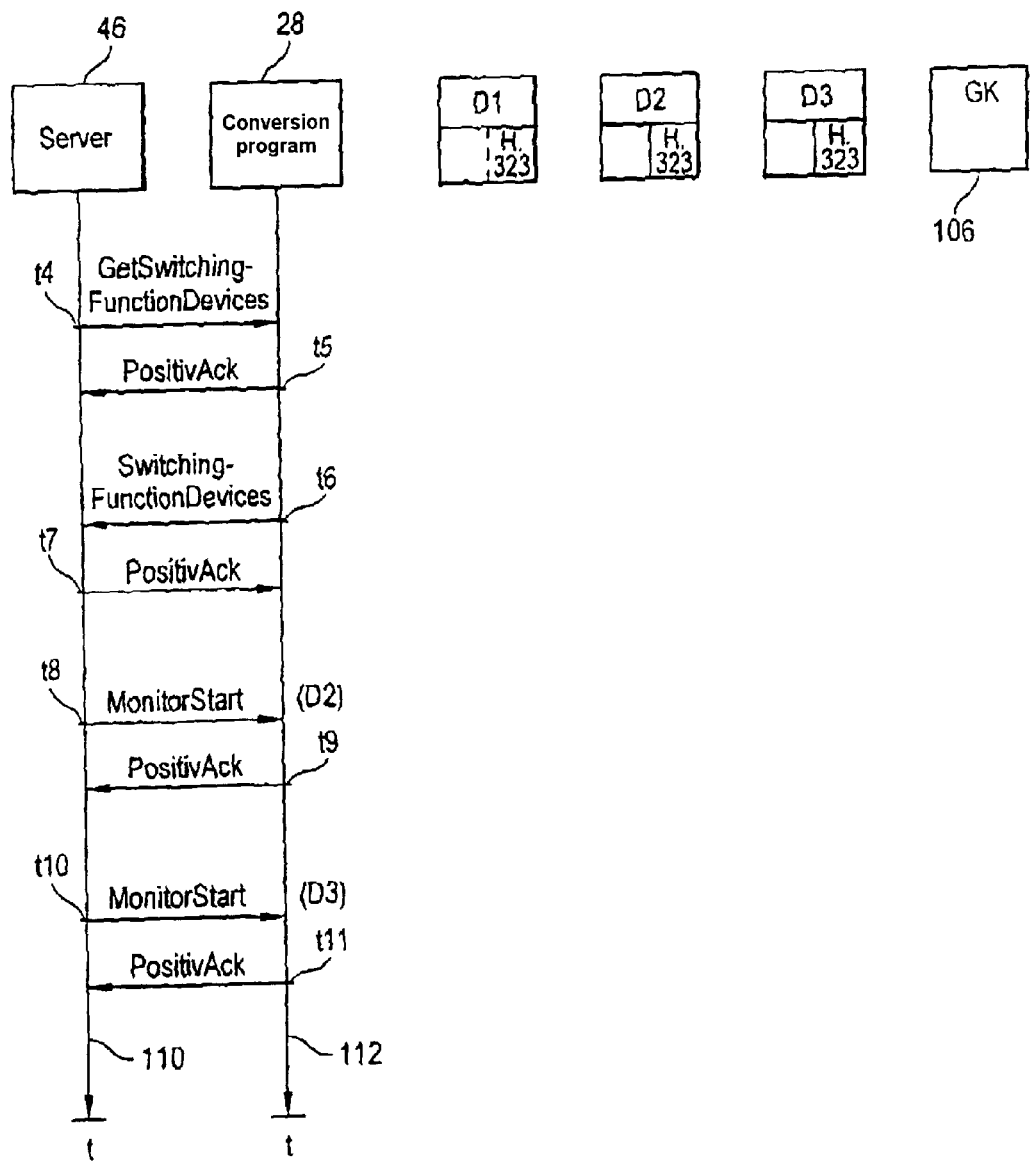
FIG. 3 shows messages transmitted by terminals at the start of monitoring.

FIG. 3 shows messages which are interchanged between the server 46 and the conversion program 28 by the call distribution program 42 at the start of monitoring of the terminals D2 and D3. As already mentioned, these messages correspond to the messages defined in the CSTA III Standard. Processes in the server 46 are plotted on a time axis 110. One time axis 112 relates to processes during execution of the conversion program 28.

At a time t4 which occurs after the time t3, see FIG. 2, the server 46 passes on a message "GetSwitchingFunctionDevice", which originally arrived from the call distribution program 42, to the conversion program 28. The message is passed on as a function of a domain identifier in the message arriving from the call distribution program 46. The domain identifier is assigned to the conversion program 28. The message "GetSwitchingFunctionDevices" is used to determine those terminals which are currently ready to operate. At a time t5, the conversion program 28 confirms reception of the message "GetSwitchingFunctionDevices" by transmitting a message "PositiveAck" via the server 46 to the call distribution program 42.

At a time t6, the conversion program 28 transmits a message "SwitchingFunctionDevices" containing a unit list with unit identifiers for the terminals D2 and D3, to the call distribution program 42. In the exemplary embodiment, the identifiers correspond to the names of these units; that is, D2 and D3. At a time t7, the call distribution program 42 confirms reception of the message "SwitchingFunctionDevices" by an acknowledgement message "PositiveAck" which is transmitted via the server 46 to the conversion program 28.

At a time t8, the server 46 passes on a message "MonitorStart", arriving from the call distribution program 42, to the conversion program 48. The message "MonitorStart" is used to indicate that the terminal D2 will be monitored by the call distribution program 42. The identifier D2 is therefore quoted as a unit identifier in a parameter list in the message "MonitorStart". The message "MonitorStart" also contains filter details relating to which events should be reported to the call distribution program 42. At a time t9, the conversion program 28 confirms reception of the message "MonitorStart" by an acknowledgement message "PositiveAck" which is passed on via the server 46 to the call distribution program 42. The confirmation message t9 contains a monitoring identifier "monitorCrossRefID"=D2. Using this identifier, the message "PositiveAck" can be passed on to the call distribution program. Furthermore, the call distribution program 42 can uniquely assign the message "PositiveAck" to the terminal D2 using the monitoring identifier "monitorCrossRefID". The monitoring identifier "monitorCrossRefID=D2" is quoted in all the event messages which are produced by the terminal D2, so that it can be passed on by the server 46 and the allocation in the call distribution program 42.

At a time t10, a message "MonitorStart" arriving from the call distribution program 42 is passed on via the server 46 to the conversion program 28. This message requests the conversion program 28 to pass on event messages arriving from the feeder program 36 to the call distribution program 42. The message "MonitorStart" transmitted at the time t10 includes a unit identifier "DeviceID"=D3 and details relating to the messages to be passed on, in a filter condition.

At a time t11, the conversion program 28 confirms reception of the message "MonitorStart" relating to the terminal D3 via a confirmation message "PositiveAck", which is passed via the server 46 to the call distribution program 42. In the confirmation message "PositiveAck", the monitoring identifier "monitorCrossRefID" has a value indicating the terminal D3. The monitoring identifier is, in turn, used for passing on and allocating the monitoring message.

Figure 4:
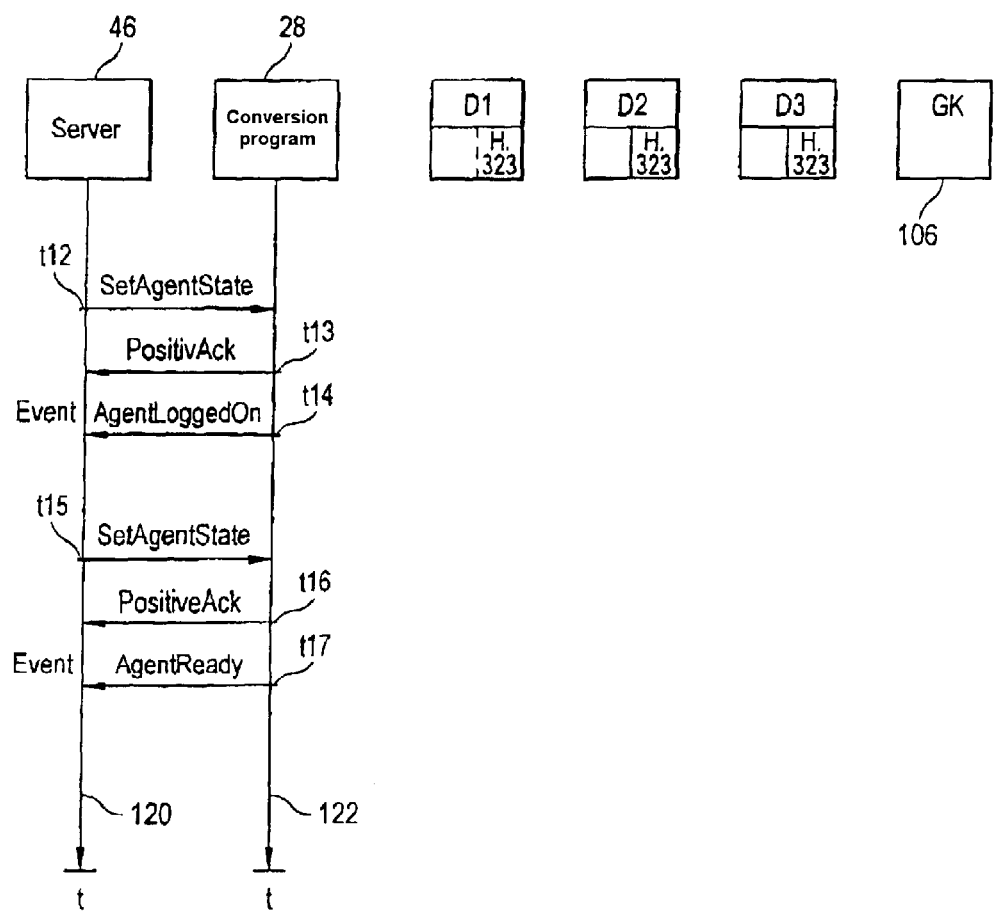
FIG. 4 shows messages transmitted during activation of a call receiving terminal.

FIG. 4 shows messages transmitted on activation of the call receiving terminal D3. A time axis 120 is used to illustrate processes in the server 46. A time axis 122 is associated with the conversion program 28.

When the terminal D3 is ready to receive calls arriving at the central terminal D2, then the operator registers the terminal D3 using the call receiving program 40. In this case, a message "SetAgentState" is transmitted via the data transmission connection 44 to the server 46. This message is passed on, firstly, to the call distribution program 42 and, secondly, to the conversion program 28 at a time t12 which occurs after the time t11. The identifier for the terminal D3, that is to say the designator D3, is quoted in the message "SetAgentState" as the unit identifier "DeviceID". A state parameter "Request.AgentState" has a value which corresponds to the state on registration. This state is also referred to as "LoggedOn". Furthermore, the message contains an identifier "agentID" to identify the person operating the terminal D3.

The message "SetAgentState" informs the conversion program 28 that the terminal D3 is ready to receive calls in the course of call distribution. At a time t13, the conversion program 28 confirms reception of the message "SetAgentState" by a confirmation message "PositiveAck" which is passed on via the server 46 to the call distribution program 42. The confirmation message "PositiveAck" includes a state parameter "pendingAgentState" whose value indicates that the terminal D3 is not yet ready to receive calls in the course of call distribution. This state is also referred to as "not ready". In the course of monitoring the terminal D3, the conversion program 28 transmits an event message "agentLoggedOn" at a time t14. The identifier for the terminal D3 is stated in the event message as a monitoring identifier "monitorCrossRefID". The identifier D3 for the terminal D3 is likewise stated as a registered terminal "agentDevice". Furthermore, the event message includes an identifier "agentID" in order to identify the person operating the terminal D3.

As soon as the terminal D3 is ready to receive calls in the course of call distribution, the call receiving program 40 transmits a further message "SetAgentState" to the call distribution program 42 via the data transmission connection 44. In the server 46, a unit identifier "DeviceID"=D3 included in the message is used to confirm that this relates to the terminal D3. For this reason, the message is also passed on to the conversion program 28 at a time t15. The state parameter "Request.AgentState" now has a value which corresponds to the state "ready". The message "SetAgentState" transmitted at the time t15 also includes the user identifier "agentID".

At a time t16, the conversion program 28 confirms reception of the message "SetAGentState", received at the time t15, by a confirmation message "PositiveAck" in which a value is quoted as state parameter "pendingAgentState" indicating the "ready" state. The confirmation message "PositiveAck" is passed on via the server 46 to the call distribution program 42.

At a time t17, the conversion program 28 transmits an event message "Event AgentReady" to the call distribution program 42. The event message includes the identifier D3 for the terminal D3 as the monitoring identifier "monitorCrossRefID". The identifier D3 is likewise stated as the call receiving terminal "agentDevice". The event message also includes the user identifier "agentID" of the person operating the terminal D3.

The message "SetAgentState" with the state indication "ready" makes it possible for the conversion program 28 to identify the terminal D3 as a terminal which can be used for receiving calls in the course of call distribution. According to the CSTA Standard, the terminal D3 is then so-called agent terminal.

Figure 5:
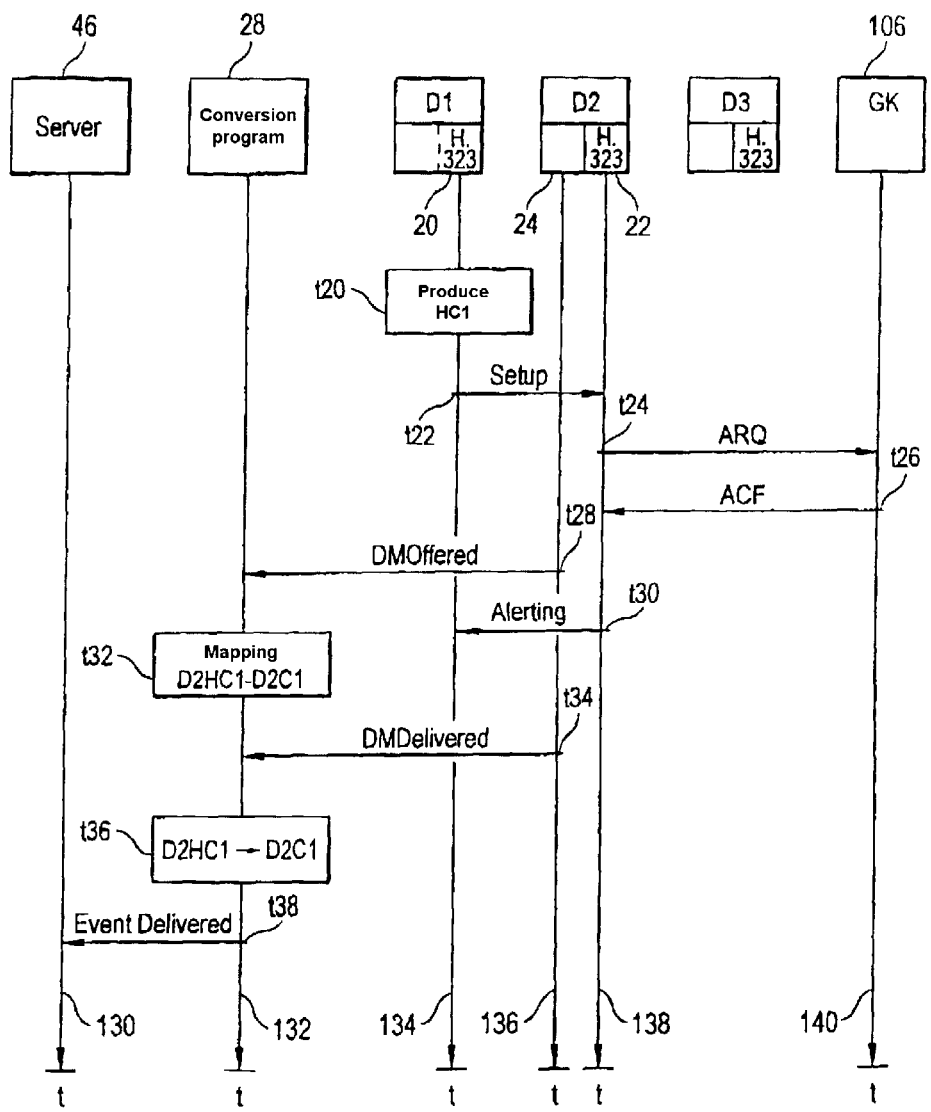
FIG. 5 shows messages transmitted during calling a central terminal.

FIG. 5 shows the messages transmitted when calling the central terminal D2. Time axes 130 to 140 are assigned, in this sequence, to the server 46, to the conversion program 28, to the programs 20 associated with the H.323 protocol stack in the terminal D1, to the feeder program 24, to the programs 22 associated with the H.323 protocol stack in the terminal D2, and to the access unit 106. At a time t20, a connection identifier HC1 is produced in the terminal D1 and is intended to be used for a connection which is to be set up. At a time t22, which occurs after the time t20, a call setting-up message "Setup" is used by the terminal D1 to call the terminal D2. In this case, the message "Set-up" includes the connection identifier "CallID"=HC1. As is noted in the H.323 Standard, the terminal D2 produces an access request (ARQ (Admission Request) to the access unit 106 at a time t24. The access request contains the address of the terminal D2 as the address "SrcCallSigAddr" of the requesting terminal. In addition, a required bandwidth is stated. The access unit 106 confirms the access request ARQ at a time t26 with an access confirmation message ACF (Admission Confirm). The message ACF also complies with the H.323 Standard.

After receiving the access confirmation message ACF in the terminal D2, a message "DMOffered" is transmitted by the feeder program 24 to the conversion program 28 at a time t28. The message "DMOffered" includes the identifier HC1 as the connection identifier "CallID". In addition, it includes a parameter "callingDirectoryNumber" which indicates a directory number which relates to the calling terminal, that is to say to the terminal D1. The message "DMOffered" indicates the conversion program 28 that there is a call request to the terminal D2. The message "DMOffered" corresponds substantially to the message "offered" defined in the CSTA III Standard, see Section 17.2.13 of the Standard. At a time t30, the terminal D2 transmits an alarm message "Alerting" in accordance with the H.323 Standard, in order to signal that the terminal D2 is indicating the incoming call via an alarm device; for example, by using a signal generator to produce a signal tone. The identifier HC1 is stated as the connection identifier "CallID" in the alarm message "Alerting".

At a time t32, the conversion program 28 produces a relationship between an identifier provided in the CSTA III Standard and an identifier which includes the unit identifier D2 and the identifier HC1 from the H.323 Standard. The connection identifier D2HC1 is assigned a connection identifier D2C1.

At a time t34, the feeder program 24 transmits a message "DMDelivered" to the conversion program 28. This message corresponds substantially to the message "delivered" provided in the CSTA III Standard. The message "DMDelivered" is used by the terminal D2 to indicate to the conversion program that the incoming call is now being signaled to the operator. The message "DMDelivered" includes the connection identifier "CallID"=HC1 as the connection identifier.

At a time t36, the conversion program 28 converts the connection identifier HC1 to a connection identifier in accordance with the CSTA III Standard. In this case, the relationship produced at the time t32 is used, from which it can be determined that the connection identifier D2HC1 is associated with the connection identifier HC1 and that the CSTA identifier D2C1 is, in turn, associated with the connection identifier D2HC1.

At a time t38, the conversion program transmits an event message "Event Delivered" via the server 46 to the call distribution program 42. The event message contains a number of parameters:

The monitoring identifier "monitorCrossRefID" has the value D2.

A connection identifier "connection" has the value D2C1.

The terminal D2 is stated as the alarmed terminal "alertingDevice".

A parameter "callingDevice" for the calling terminal contains the value D1 for the terminal D1.

A parameter "calledDevice" for the called terminal contains the value D2 for the terminal D2.

The association between the connection identifiers for different connection models at the time t38 will be explained in more detail with reference to FIG. 6.

Figure 6:
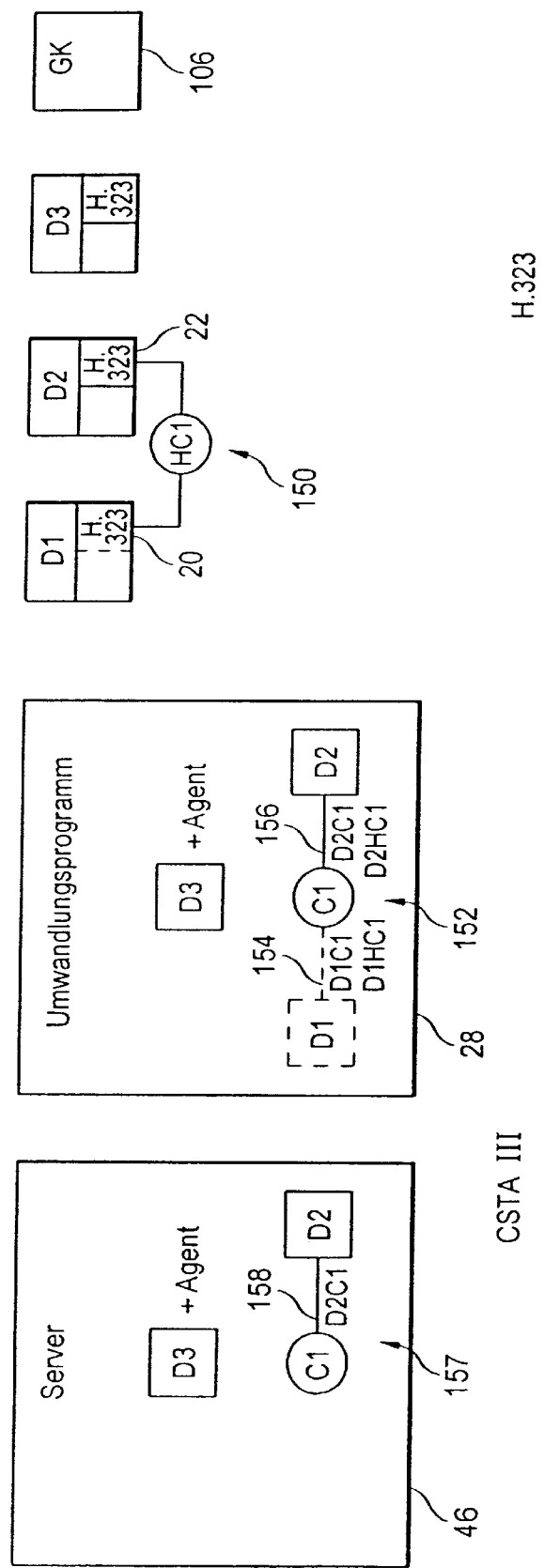
FIG. 6 shows identifiers for various connection models once the central terminal has been called.

FIG. 6 shows the connection identifiers for various connection models 150 and 152. The connection model 150 corresponds to the connection model used in the H.323 Standard. In this connection model, a single connection identifier is assigned to the units involved in the connection. In the exemplary embodiment, the connection identifier HC1 is assigned to the connection to be set up between the terminals D1 and D2. The connection model 152 corresponds substantially to the model defined in the CSTA III Standard. In this case, there is no connection between two terminals, and the connection exists only between one terminal in each case and a call. A connection 154 between the terminal D1 and a call C1 is thus allocated the connection identifier D1C1. A first part of the connection identifier in each case contains the identifier for the unit involved, in this case D1, and a second part contains the identifier of the call involved, in this case C1. Dashed lines in FIG. 6 indicate that the conversion program includes the connection 154 and the terminal D1 in the model only when the terminal D1 also has a feeder program 52 (see FIG. 1). According to the connection model 152, a connection 156 between the call C1 and the terminal D2 is referred to by a connection identifier D2C1. In addition, the connections 154, 156 in the connection model 152 are denoted by connection identifiers in accordance with the H.323 Standard, which are preceded by the identifier for the unit involved; see, for example, the connection identifiers D1HC1, and D2HC1.

FIG. 6 also shows that the conversion program 28 accesses data which indicate that the terminal D3 is ready to operate as a terminal for receiving calls in the course of call distribution; that is, it is ready to operate as a so-called agent terminal. At the server 46 end and at the call distribution program 42 end, only identifiers in accordance with the CSTA III Standard are known in a connection model 157. In addition, only the monitored terminals D2, D3 are included in the connection model 157 in the call distribution program 42. A connection 158 with the connection identifier D2C1 thus exists between the call C1 and the terminal D2, that is to say with a layout as defined in the CSTA III Standard. The call distribution program 42 end is also aware that the terminal D3 is ready to receive calls in the course of call distribution, as a so-called agent terminal.

Figure 7A:
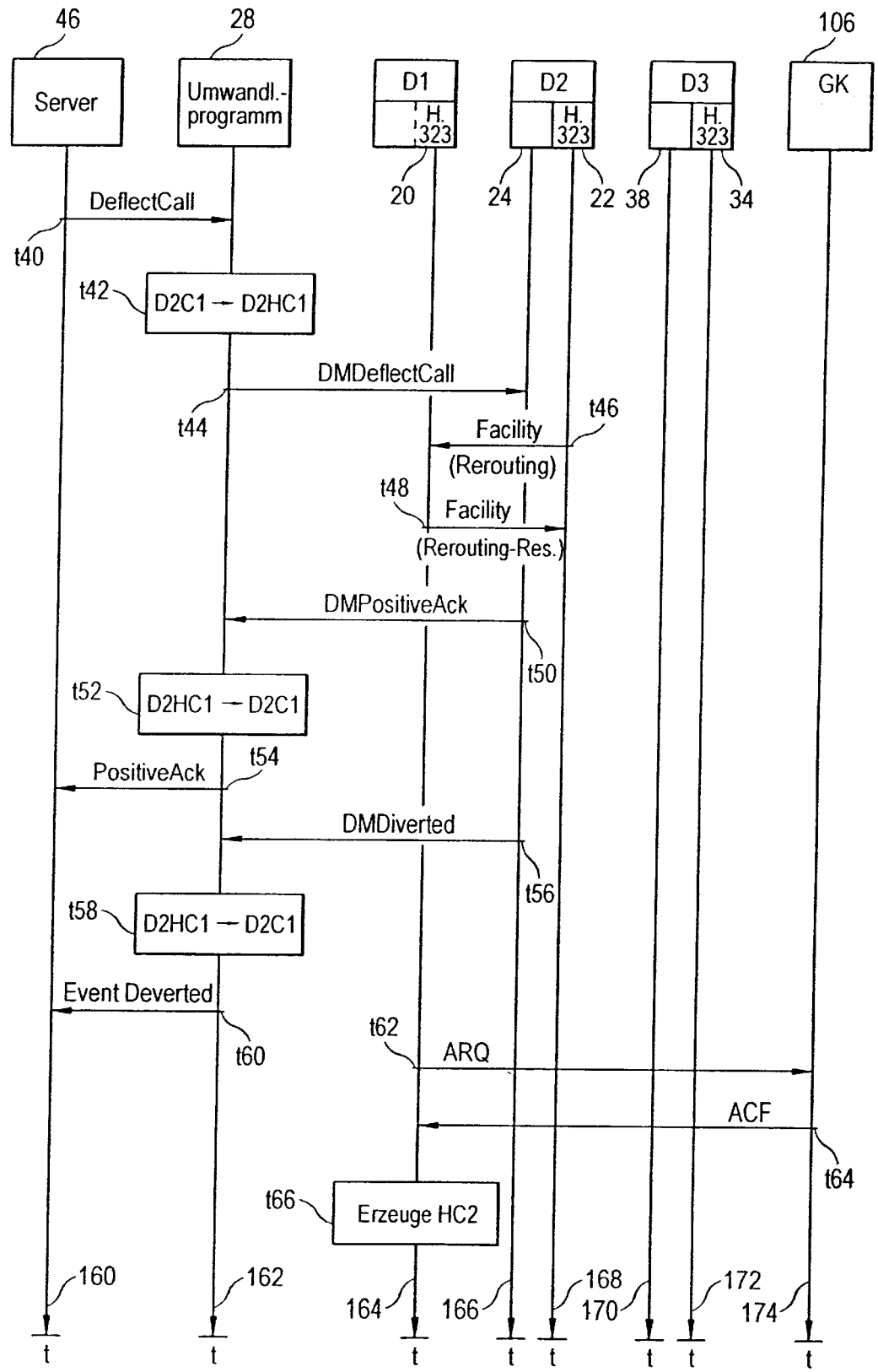
FIGS. 7A and B show messages which are transmitted during call distribution.
Figure 7B:
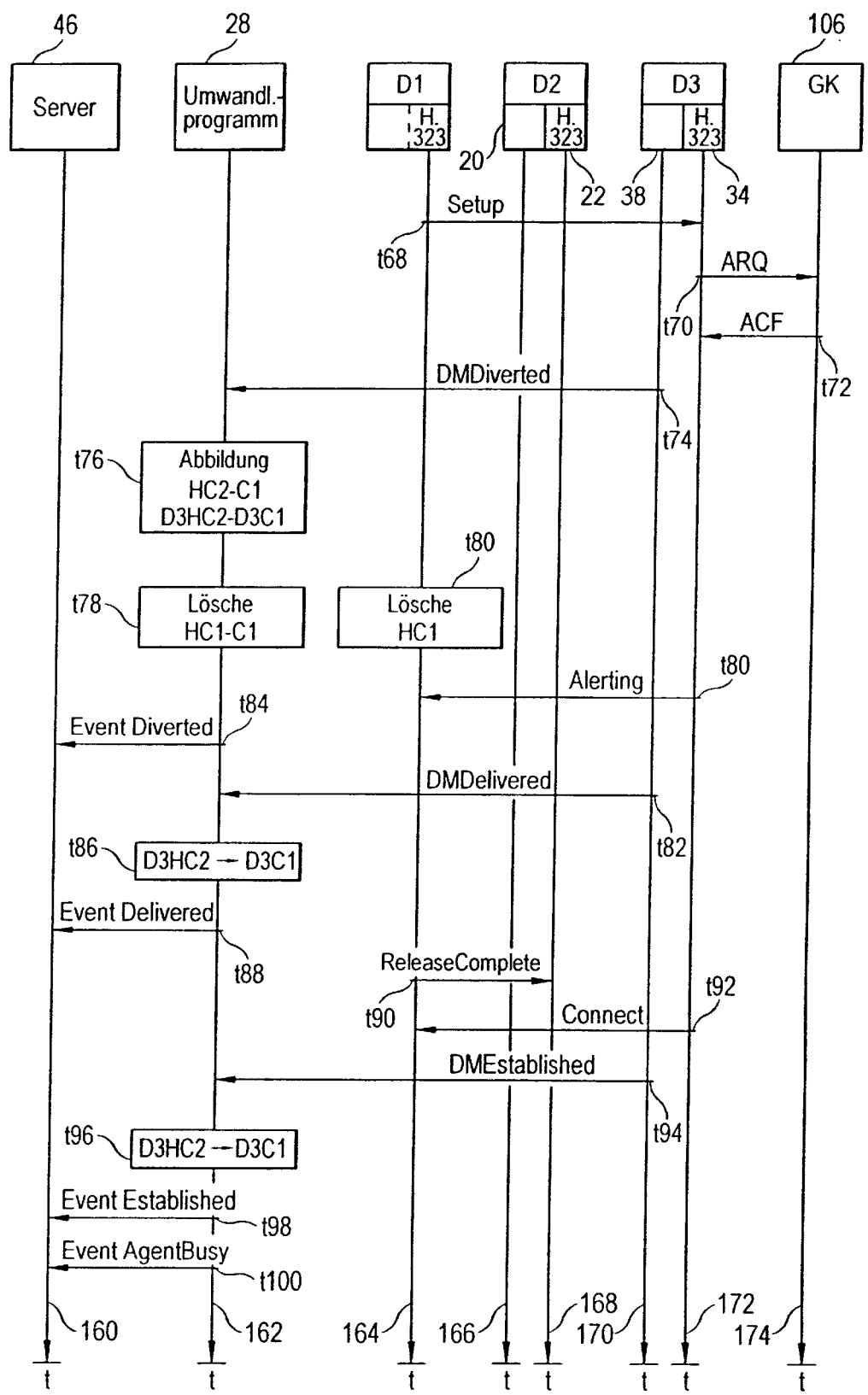

FIGS. 7A and 7B show messages transmitted during call distribution. Time axes 160 to 174 are associated, in this sequence, with the server 46, the conversion program 28, the programs 20 which are associated with the H.323 protocol stack of the terminal D1, the feeder program 24, the programs 22 which are associated with the H.323 protocol stack for the terminal D2, the feeder program 28, the programs 34 associated with the H.323 protocol stack, and the access unit 106. The call distribution originates from the call distribution program 42. The decision to distribute the call arriving at the central terminal D2 to the terminal D3 is made during execution of the call distribution program 42 on the basis of the event message "Event Delivered" transmitted at the time t38. The call distribution program produces a diversion message "DeflectCall" in accordance with the CSTA III Standard in order to divert the call arriving at the terminal D2 to the terminal D3. The diversion message "DeflectCall" is first of all passed to the server 46 and then, at a time t40, to the conversion program 28. The connection D2C1 is stated in the parameters in the diversion message "DeflectCall" to be a connection which is affected by the diversion. The corresponding parameter is referred to as "callToBeDiverted". The identifier D3 of the terminal D3 is stated in a destination parameter "newDestination", in order to define the destination for the diversion.

At a time t42, the conversion program 28 determines the connection identifier associated with the connection identifier D2C1 stated in the diversion message "DeflectCall", using the internal protocol. This is the connection identifier D2HC1, in which the second part HC1 corresponds to the identifier in accordance with the H.323 Standard. At a time t44, the conversion program 28 produces a diversion message "DMDeflectCall", which is transmitted to the feeder program 24 in the terminal D2. The diversion message "DMDeflectCall" contains the connection identifier D2HC1 as the parameter "callToBeDiverted" for the relevant connection. The parameter "newDestination" for the destination unit is transferred from the "DeflectCall" message and has the value D3.

After receiving the message "DMDeflectCall", the call diversion is carried out in the terminal D2 as disclosed in the H.323 Standard and in the H.450.3 Standard. A service feature message "Facility" is transmitted from the terminal D2 to the terminal D1 at a time t46. The service feature message "Facility" contains a number of parameters:

A parameter "CallRerouting.Invoke" is used to identify the higher-level service feature call diversion.

The letter sequence "cd" is quoted for a call diversion (call deflect) as the reason for diversion in the service feature message "Facility".

The number of the terminal D2 is included in a parameter "originalCalledNr" for the originally called number.

A parameter "calledAddress" for the address to be called contains the address of the terminal D3.

A parameter "callingNumber" for the number of the calling terminal contains the number of the terminal D1.

In accordance with the Standard, the terminal D1 transmits a service feature message "Facility" to confirm reception of the first service feature message, at a time t48. A parameter "CallRerouting.Ret.Result" in the message transmitted at the time t48 provides a reference to the relevant service feature.

Once the "Facility" message has been received in the terminal D2, the feeder program 24 transmits a confirmation message "DMPositiveAck" to the conversion program 28 at a time t50, in order to confirm the message "DMDeflectCall". The message "DMPositiveAck" includes the identifier D2HC1 as the connection identifier.

At a time t52, the conversion program 28 determines the [connection identity] with regard to the identifier D2HC1, that is to say with regard to the identifier stated in the "DMPositiveAck" message, the connection identifier D2C1 with a layout in accordance with the CSTA III Standard. At a time t54, the conversion program 28 transmits a confirmation message "PositiveAck" to the call distribution program 42. The connection identifier D2C1 is stated as the connection identifier in this confirmation message. The confirmation message "PositiveAck" confirms the diversion message "DeflectCall".

At a time t56, the feeder program 24 transmits a message "DMDiverted" to the conversion program 28 in order to report that the request for call diversion has been passed on to the terminal D1:

The message "DMDiverted" includes the identifier D2HC1 as the connection identifier "connection".

The terminal D2 is stated as the diverting terminal "divertingDevice".

A destination parameter "newDestination" contains the identifier D3 for the terminal D3.

A parameter "cause" is used to state the reason for the diversion, with the call diversion being carried out on the basis of a request from the call distribution program, also referred to as "ACD (Automatic Call Distribution) Forward".

A parameter "localConnectionInfo" relating to the connection state has the value 0. This parameter is defined in the CSTA III Standard and has been adopted for the message "DMDiverted".

At a time t58, the connection identifier D2HC1 is read from the message "DMDiverted" in the conversion program 28 and is converted to a connection identifier with the layout specified in the CSTA III Standard, namely being converted to the connection identifier D2C1. Then, at a time t60, the converted identifier D2C1 is used for sending an event message "Event Diverted" from the conversion program 28 via the server 46 to the call diversion program 42:

The event message "Event Diverted" contains the identifier of the terminal D2 as the monitoring identifier "monitorCrossRefID".

The connection identifier D2C1 is stated as the connection identifier "connection".

A statement "divertingDevice" for the diverting terminal is taken from the message "DMDiverted", that is to say the identifier D2.

The statements for the destination "newDestination", the reason "cause" and the connection state "localConnectionInfo" are likewise transferred from the message "DMDiverted" to the message "Event Diverted".

At a time t62, the terminal D1 transmits an access request message ARQ to the access unit 106. The address of the terminal D3 is stated as the source address "SrcCallSigAddr" in the access request message ARQ. The message ARQ also includes a value for the requested bandwidth. At a time t64, the access unit 106 confirms the access request with a message ACF. At a time t66 after reception of the access confirmation message ACF, a new connection identifier HC2 is produced in the terminal D1. The connection identifier HC2 is used at a time t68 in a connection setting-up message "Setup" transmitted from the terminal D1 to the terminal D3:

The connection setting-up message "Setup" is produced in accordance with the H.450.3 Standard and includes a service feature parameter "divertingInfo2.Invoke". This parameter indicates that the "Setup" message has been produced as a consequence of a call diversion.

A counting parameter "diversion Counter" for counting the call diversions has the value 1 in the "Setup" message.

The reason for the diversion "diversionReason" is stated to be call diversion, also referred to as "Call Deflection".

The "Setup" message also contains a parameter to indicate the telephone number of the originally called terminal, that is to say of the central terminal D2.

The "Setup" message is processed in accordance with the Standard in the terminal D3. In this case, an access request message ARQ is transmitted to the access unit 106 at a time t70. The message contains a value for the requested bandwidth. The access request message ARQ is confirmed, in accordance with the Standard, by the access unit 106 at a time t72 using an access confirmation message ACF. Once the access confirmation message ACF has been received in the terminal D3, a message "DMDiverted" is transmitted to the conversion program 28 at a time t74 since, on the basis of the parameter contained in the "Setup" message, the terminal D3 establishes that this is a call diversion in the course of call distribution. In contrast to a "Setup" message for a connection other than in call distribution, the message "DMDiverted" is now transmitted instead of the message "DMOffered" transmitted there:

The message "DMDiverted" contains the identifier D3HC2 as the connection identifier "connection".

The identifier D2 of the terminal with the same name is stated as the identifier "divertingDevice" of the diverting terminal. This identifier is transferred from the "Setup" message.

The identifier D3 of the terminal D3 is stated as the identifier "newDestination" for the diversion destination.

Call diversion, also referred to as "Call Forward", is quoted as the reason "cause" for the diversion.

The parameter "localConnectionInfo" for the local connection state has the value 0.

Once the message "DMDiverted" has been received in the conversion program 28 at a time t76, an association is produced between the identifier HC2 and the call C1. An association is likewise produced between the identifier D3HC2 and D3C1. The association between the connection identifier HC1 and the call C1 is canceled, see time t78. At the same time, the connection identifier HC1 is released once again in the terminal D1, see reference symbol 180.

At a time t80, the terminal D3 transmits an alarm message "Alerting" to the terminal D1 in accordance with the H.323 Standard. The identifier HC2 is used as the connection identifier. At a later time t82, the terminal D3 transmits a message "DMDelivered" to the conversion program 28 in order to indicate that the call arriving at the terminal D3 has been reported to the person operating this unit:

The message "DMDelivered" includes the connection identifier "connection"=D3HC2.

The terminal D1 is stated for the calling terminal "Calling Device".

An identifier "alertingDevice" for the alarmed terminal denotes the terminal D3.

An identifier "calledDevice" for the called terminal relates to the terminal D2.

An identifier "lastRedirectionDevice" for the terminal most recently included in the diversion likewise relates to the terminal D2.

Between the times t80 and t82, there is a time t84 at which the conversion program 28 transmits an event message "Event Diverted" to the call distribution program 42 as a reaction to reception of the message "DMDiverted":

The event message includes the monitoring identifier "monitorCrossRefID"=D3.

The identifier D2C1 is stated as the connection identifier "connection".

The identifier D2 is noted as the identifier "divertingDevice" of the diverting terminal.

The identifier D3 of the terminal with the same name is included in the message as the identifier "newDestination" for the new destination.

Call distribution "ACD Forward" is stated as the reason "cause" for the diversion.

The parameter "localConnectionInfo" for the connection state has the value 0.

The values for the diverting terminal, the new destination, the reason and the connection state are transferred from the message "DMDiverted".

After receiving the message "DMDelivered" the conversion program 28 converts the connection identifier D3HC2 to the connection identifier D3C1 at a time t86. The message "DMDelivered" is passed on from the conversion program 28 to the call distribution program 42 at a time t88 using an event message "Event Delivered":

The converted connection identifier D3C1 is included in the message as the parameter "connection" for the connection.

The identifier D3 is stated as the monitoring identifier "monitorCrossRefID".

The event message "Event Delivered" includes a parameter "alertingDevice" to denote the alarmed terminal, in this case the terminal D3.

A parameter "callingDevice" for the calling terminal denotes the terminal D1.

A parameter "calledDevice" for the called terminal relates to the terminal D2.

A parameter "RedirectionDevice" for the diverting terminal indicates the terminal D2.

A parameter for the reason "cause" for the diversion includes a value for call distribution, also referred to as "ACD Forward".

At a time t90, the terminal D1 transmits a release message "ReleaseComplete" to the terminal D2 in accordance with the Standard as a reaction to reception of the "Alerting" message, see time t80, in order to completely release the original connection; that is, the connection with the identifier HC1 to the central terminal D2. At a time t92, the terminal D3 transmits a connection message "Connect" in accordance with the H.323 Standard to the terminal D1 in order to signal that the person operating the terminal D3 has received the call. The connection message includes the identifier HC2 as the connection identifier. It also includes a parameter, namely the parameter "divertingLegInfo3.lnvoke", which indicates call diversion. The number of the terminal D3 is stated as the number "redirectionNo" of the unit to which the call has been diverted.

The feeder program 36 of the terminal D3 then transmits a message "DMEstablished" at a time t94 to the conversion program 28 in order to signal that the connection has been set up at the CSTA III level as well. The message "DMEstablished" contains:

a parameter "establishedConnection" to denote the connection which has been set up, in this case with the value D3HC2, a parameter "answeringDevice" for the answering terminal, in this case the terminal D3, a parameter "callingDevice" for the calling terminal, in this case the terminal D1, a parameter "calledDevice" for the called terminal, in this case the terminal D2, a parameter "lastRedirectionDevice" for the last diverting terminal in this case the terminal D2, and a parameter "cause" for the reason for the diversion, in this case call forwarding, also referred to as "Call Forward".

At a time t96, the connection identifier D3HC2 from the message "DMEstablished" is converted to the identifier D3C1, whose layout corresponds to the layout disclosed in the CSTA III Standard.

Then, at a time t98, the converted identifier D3C1 is used to transmit an event message "Event Established" from the conversion program 28 to the call distribution program 42. The event message "Event Established" contains the following parameters:

a monitoring parameter "monitorCrossRefID" with the value D3, a parameter "establishedConnection" for the connection which has been set up, in this case the converted connection identifier D3C1, a parameter "answeringDevice" for the answering terminal, in this case the terminal D3, a parameter "callingDevice" for the calling terminal, in this case the terminal D1, a parameter "calledDevice" for the called terminal, in this case the terminal D2, a parameter "redirectionDevice" for the diverting terminal, in this case the terminal D2, and a parameter "cause" to denote the reason for the diversion, in this case call distribution, also referred to as "ACD Forward".

The call distribution program 42 can use the event message "Event Established" to complete the process of setting up the diverted connection between the terminal D1 and the call receiving terminal D3.

At a time t100, the conversion program 28 transmits an event message "Event AgentBusy" including the server 46, to the call distribution program 42. The event message "Event AgentBusy" has used a signal that the call receiving terminal D3 is not ready to receive calls in the course of call distribution at that time. The event message includes the identifier of the terminal D3 as the monitoring identifier "monitorCrossRefID". In addition, the event message includes an identifier for the terminal receiving the call in the course of call distribution; that is, the identifier D3. An identifier "AgentID" for identification of the person operating the terminal D3 is also stated in the event message.

The conversion program 28 transmits the event message "Event AgentBusy" only when the call affected by this message is a call in the course of call distribution. The conversion program 28 can use the parameter "calledDevice"D2 in the message "DM Established" to confirm that this is a call in the course of call distribution, since the call arrival terminal D2 is that which was originally called.

Figure 8:
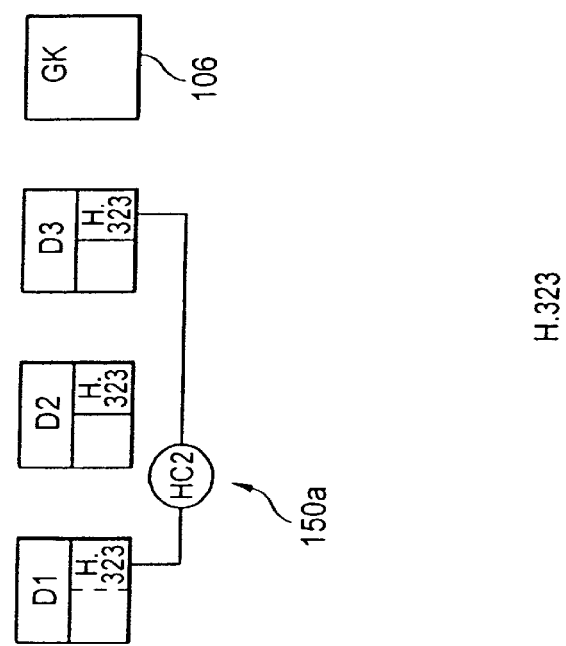
FIG. 8 shows identifiers for various connection models after call diversion in the course of call distribution.
Figure 8:
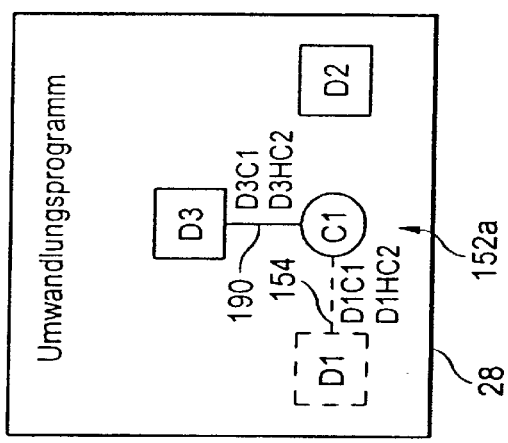
Figure 8:
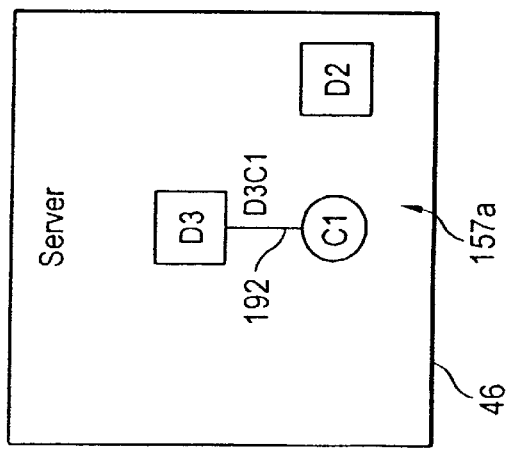

FIG. 8 shows identifiers from connection models 150a and 152a after call diversion in the course of call distribution. The identifier in the H.323 connection model 150a has changed in comparison to the identifier in the connection model 150. The connection between the terminal D1 and the call receiving terminal D3 has the connection identifier HC2.

The connection model 152a still relates, like the connection model 152, to the call C1. The call diversion process now results in a connection 190 to the terminal D3 from the call C1. The connection 190 has the identifier D3C1 in accordance with CSTA III. The conversion program has assigned the identifier D3HC2 to the identifier D3C1. The identifier HC2 in accordance with the H.323 Standard is obtained by removing the first part D3 of this identifier.

If the terminal D1 also contains a feeder program, then the connection 154 between the terminal D1 and the call C1 would be modeled in the connection model 152a. In this case, the identifier D1C1 in accordance with CSTA III would remain unchanged for this connection. However, the conversion program would now allocate the identifier D1HC2 to the identifier D1C1. Removing the first part D1 from this identifier results in the identifier HC2 for the corresponding connection in accordance with the H.323 Standard. The connection 156 is no longer modeled in the connection model 152a.

At the server 46 or call distribution program 42 end, only that part of the connection model 152a which relates to the CSTA III Standard is known. A connection 192 between the call C1 and the terminal D3 is thus modeled in a connection model 157a. The connection 192 has the identifier D3C1. The connection 158 between the call C1 and the terminal D2 is no longer included in the connection model 157a, in comparison to the connection model 157.

It is evident from FIGS. 1 through 8 how call diversion can be carried out in accordance with the CSTA III Standard in terminals which operate in accordance with the H.323 Standard. The two Standards can be combined by modeling different connection models and two-stage conversion of the connection identifiers disclosed in the respective models. Two-part identifiers in accordance with the CSTA III Standard are used between the conversion program 28 and the server 46, and between the conversion program 28 and the call distribution program 42. Two-part identifiers, which are based on the identifier in accordance with CSTA III Standard, are used between the conversion program 28 and the feeder programs 20 and 38. In contrast to the Standard, however, connection identifiers in accordance with the H.323 Standard are used in the second part of the connection identifiers. In the terminals, the second part is removed from the identifiers used in the feeder programs 20 and 38, in order to obtain the identifier in accordance with the H.323 Standard. On the other hand, based on an identifier in accordance with the H.323 Standard, a new identifier can be produced in a feeder program for the conversion program 28 by prefixing it by an identifier for the respective terminal D2 or D3.

The method which has been explained also can be modified within the scope of the present invention. For example, connections to the terminals D1, D2 and D3 also can be set up via the access unit 106, see the H.323 Standard, Section 8.1, "Phase A—Call-Setup". In the exemplary embodiment shown in FIGS. 1 through 8, the multiple-step confirmation model disclosed in the CSTA Standard has been used for signaling. In this model, a confirmation message is first of all used to confirm that an arriving message contains all the required parameters. In a second step, fault-free implementation of the request is confirmed, for example, via an event message. Other confirmation models are used in other exemplary embodiments.

The method of the present invention and its refinements are also used in telecommunications networks in which a number of local area networks are connected to one another; for example, in the Internet. This means that the terminals D1 to D3 are connected to different local area networks each of which has an access unit (Gatekeeper). The access units control the terminals by interchanging messages with one another as disclosed in the H.323 Standard.

In other exemplary embodiments, other protocols of similar performance are used instead of the protocol in accordance with the CSTA Standard; for example, the TAPI protocol from MICROSOFT, the JTAPI protocol from SUN, or the TSAPI protocol from NOVELL. In a next exemplary embodiment, the conversion program 28 receives messages in accordance with different protocols. In this context, reference is made to the disclosure in the German Patent Application with the Application Number 19947032.4.

Although the present invention has been described with reference to specific embodiments, those of skill in the art will recognize that changes may be made be thereto without departing from the spirit and scope of the invention as set forth in the hereafter appended claims.

I claim as my invention:

1. A method for controlling additional services functions in a communications network, the method comprising the steps of:

transmitting data to at least one of a plurality of terminals in the communications network using at least one first identifier which is used to identify a first connection according to a first connection model and a one of said plurality of terminals involved in said first connection;

converting the first identifier to at least one second identifier which is used to identify a second connection according to a second connection model which is provided for controlling additional service functions from a computer, the second identifier having a first part for identifying the terminal involved in the connection and a second part for identifying a call affected by the connection; and expanding a functionality of the at least one terminal by at least one additional service function using the second identifier.

2. A method for controlling additional service functions in a communications network as claimed in claim 1, wherein the data transmitted in the communications network contains at least one of voice data, picture data and program data.

3. A method for controlling additional service functions in a communications network as claimed in claim 1, the method further comprising the step of:

defining the first connection model for transmission of data of different media types via the H.323 Standard or a Standard based on the H.323 Standard.

4. A method for controlling additional service functions in a communications network as claims in claim 1, wherein the first identifier is a connection identifier which identifies one of an existing connection and a connection to be set up between at least two of the plurality of terminals in the communications network.

5. A method for controlling additional service functions in a communications network as claimed in claim 1, the method further comprising the step of:

defining the second connection model for controlling additional service functions of the at least one terminal in the communications network from a computer and via the CSTA Standard or a Standard based on the CSTA Standard.

6. A method for controlling additional service functions in a communications network as claimed in claim 1, wherein the additional service function relates to automatic call distribution from a central terminal of the plurality of terminals for central selection of receiving terminals of the plurality of terminals for receiving calls.

7. A method for controlling additional service functions in a communications network as claimed in claim 6, the method further comprising the step of:

executing a feeder program in the central terminal and in each of the receiving terminals wherein, in the feeder program, messages are interchanged with a central conversion program which operates as an interface between a control program for controlling the automatic call distribution and between the terminals included in the call distribution.

8. A method for controlling additional service functions in a communications network as claimed in claim 7, wherein the conversion program converts both the at least one first identifier and the at least one second identifier to one another.

9. A method for controlling additional service functions in a communications network as claimed in claim 7, wherein calls arriving from a terminal without a feeder program are distributed using the same methods as calls arriving from the terminals with a feeder program.

10. A method for controlling additional service functions in a communications network as claimed in claim 7, the method further comprising the step of:

transmitting a registration message, which contains a data item for identifying the terminal transmitting the message to the conversion program when starting the feeder program.

11. A method for controlling additional service functions in a communications network as claimed in claim 10, the method further comprising the steps of:

transmitting, via the conversion program, the identifiers of the registered terminals to the control program; and passing on to the control program, via the conversion program, at least those messages which have arrived from the central terminal.

12. A method for controlling additional service functions in a communications network as claimed in claim 11, the method further comprising the step of:

using a distribution program between the conversion program and the control program to control the passing on of the messages as a function of preset destinations.

13. A method for controlling additional service functions in a communications network as claimed in claim 12, the method further comprising the step of:

passing on messages arriving from the control program to the conversion program using an identifier which is produced by the control program and which directly or indirectly denotes the conversion program, wherein messages arriving from the conversion program contain an identifier which was previously transmitted from the control program to the conversion program in a message for monitoring a specific terminal.

14. A method for controlling additional service functions in a communications network as claimed in claim 12, the method further comprising the steps of:

executing a call receiving program in a receiving terminal; and passing on, via the distribution program, messages which are produced while executing the call receiving program to the conversion program.

15. A method for controlling additional service functions in a communications network as claimed in claim 14, the method further comprising the step of:

transmitting, when starting a call receiving program, a message in which the operating state of the terminal is signaled to the conversion program.

16. A method for controlling additional service functions in a communications network as claimed in claim 6, the method further comprising the steps of:

processing a call to the central terminal using a method based on the first connection model; and transmitting a message which signals the selection of the central terminal from the central terminal, via the conversion program, to the control program.

17. A method for controlling additional service functions in a communications network as claimed in claim 16, the method further comprising the steps of:

transmitting, via the control program and after the control program has received the message signaling the selection, a message for call diversion to a call receiving terminal;

passing on the message for call diversion from the conversion program to the central terminal; and carrying out the call diversion using a method based on the first connection model.

18. A method for controlling additional service functions in a communications network as claimed in claim 17, the method further comprising the steps of:

transmitting, via the receiving terminal which receives the diverted call, an event message which signals the arrival of a diverted call; and passing on the event message via the conversion program to the control program.

19. A method for controlling additional service functions in a communications network as claimed in claim 18, the method further comprising the step of:

transmitting to the control program, via the conversion program and after setting up a connection between the calling terminal and the receiving terminal which receives the diverted call, a message which signals that the receiving terminal cannot be included in the call distribution at the moment.

20. A communications network, comprising:

a plurality of terminals which are used for communication and which are controlled using at least one first identifier which is used, in a first connection model, to identify a first connection and a terminal involved in said first connection;

a computer for executing a control program for controlling additional service functions of the plurality of terminals using as least one second identifier, which is used, in a second connection model which differs from the first connection model, to identify a second connection and a terminal involved in said second connection; and a conversion program which is executed on one of the computer and another computer in the communications network and which, during execution, converts the first identifier to the second identifier using the first connection model, and carries out a conversion process in an opposite direction using the second connection model.

21. A conversion program, comprising a command sequence which can be executed by a processor in a data processing system, wherein execution of the command sequence causes the data processing system to convert the first identifier defined using a first connection model to a second identifier using a second connection model, said first identifier including a connection ID and a terminal ID of a terminal involved in said connection and said second identifier identifying a call and a terminal involved in said call, and execution of the command sequence also causes a conversion process to be carried out in an opposite direction in order to identify a connection for transmission of data to at least one of a plurality of terminals in the communications network, and wherein the second connection model is used for controlling additional service functions of the plurality of terminals from the computer.

22. A conversion program as claimed in claim 21, wherein the conversion program is stored on a data storage medium.

* * * * *